April 18, 1939.                M. ADAM                2,155,075
                        COPYING OF LENTICULAR FILM
                    Filed Aug. 18, 1937         2 Sheets-Sheet 1
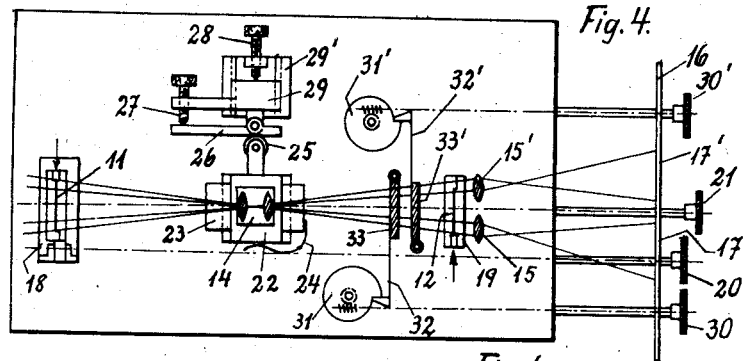
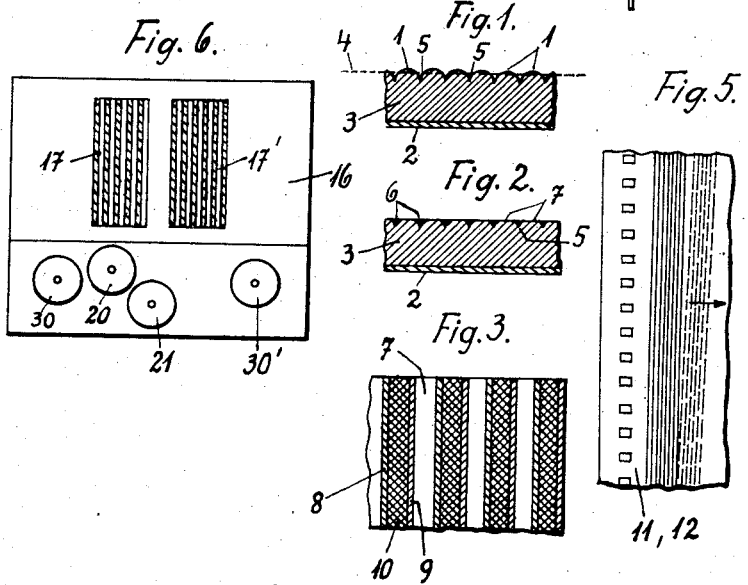
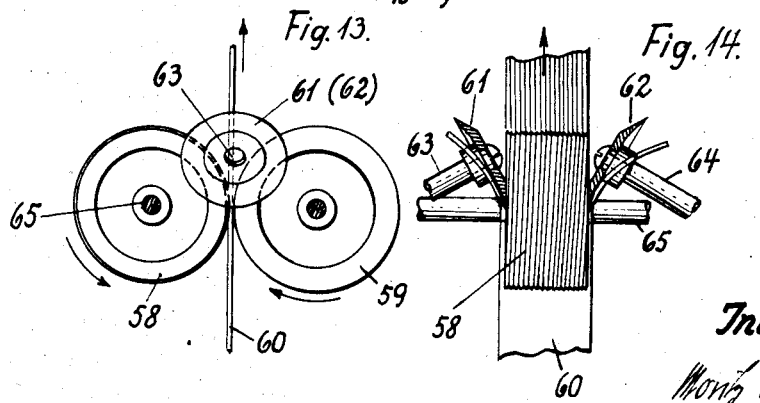
Inventor:
Moriz Adam
by Karl Nort
ATTORNEY April 18, 1939.   M. ADAM   2,155,075
COPYING OF LENTICULAR FILM
Filed Aug. 18, 1937   2 Sheets-Sheet 2
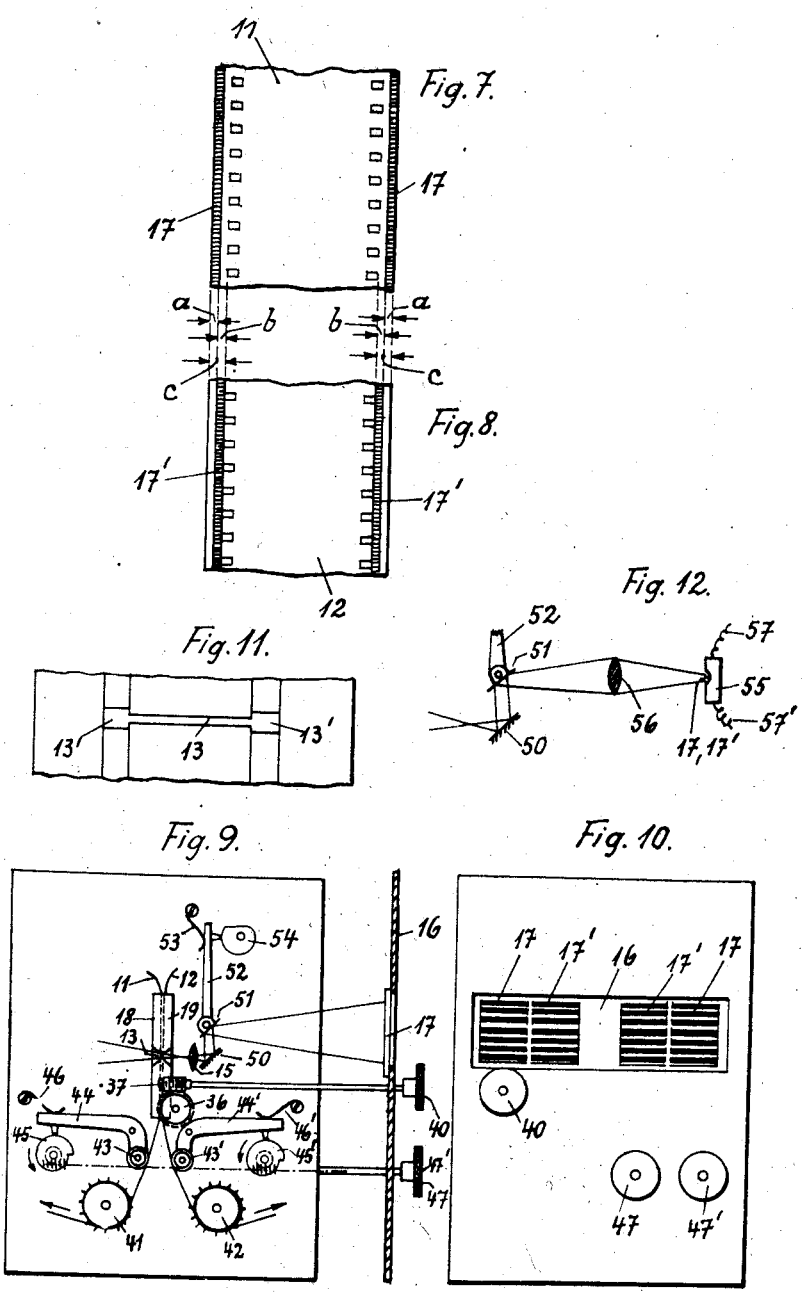

Patented Apr. 18, 1939

2,155,075

UNITED STATES PATENT OFFICE 2,155,075

COPYING OF LENTICULAR FILM

Moritz Adam, Berlin, Germany

Application August 18, 1937, Serial No. 159,639
In Germany August 27, 1936

12 Claims. (Cl. 88—24)

The invention relates to the copying of lenticular films on to copy films of similar lenticulation, and more particularly to a method of bringing the lenticulations of the original and copy films into register.

As is known a lenticular film is one having on its rear side, i. e. the side away from the emulsion, an embossed pattern of closely adjacent microscopic lenses, usually cylindrical. The film is exposed through the lenticular support with an appropriately divided colour filter at the diaphragm position, and the effect of the elementary lenses is to subdivide each point of the picture into a suitable number of closely adjacent points corresponding to the primary colours adopted. In copying such a film it is of the greatest importance that these individual colour-component points should have the same location in relation to the lenticular elements in the copy as they had in the original film—which may be a negative.

On account of the very minute dimensions of the lenticulations, amounting to 28 to 43 microns, it has been found necessary in all copying methods proposed hitherto to dispense with accurate registration of the lenticulations between original and copy. No satisfactory results could be achieved in this way.

The object of the present invention is to ensure accurate register between the lenticulations of original and copy and accordingly the correct position of the colour-component points in the copy film in relation to its lenticulation. According to the invention this result is attained by providing both original and copy films on one or both sides near the actual picture field with markings corresponding to the lenticular elements such as stripes at the same distance apart as the lenticular elements. These marks are then projected together on an enlarged scale on to a screen so that adjustments can be made in dependence on the combined image so produced. If copying is effected through an objective it is possible to adjust the objective and either or both films to get the films into register.

According to a further feature of the invention the marks may be produced by partial grinding, milling or planing of the lenticular elements at the part of the film in question, so that flat strips are formed with depressions between them which can be used as marks. Before or after the grinding the emulsion is removed at the position of the marks, or the silver or silver salt is dissolved out to render the film transparent at these parts. The edges of the film can also be made transparent if the film is exposed to strong light at the edges before, during or after the exposure, so that all the silver is reduced at the first development and is washed out before the second development. It is advantageous, instead of adopting special measures of this kind, to use for both original and copy films prepared so that there is no emulsion on the marginal parts, which are thus permanently transparent.

The registration can be facilitated by colouring the stripes or the interstices between them or by filling them with a paste by means of a scraper. If transparent colours are used it is advantageous to use different colours for the two films such as yellow on the original and blue on the copy. In this case accurate register is indicated by the stripes in the projection showing in the mixture colour, say green, only. Any want of register will show as fringing, that is each stripe will be say yellow at one side and blue at the other.

A difficulty which occurs in copying lenticular film is that the shrinkage of the two films may be different, so that the two sets of lenticulations do not register all over even when they do so at one place. With longitudinal lenticulations this difficulty can be overcome according to a further feature of the invention by providing both margins outside the picture spaces with markings and by projecting both sets of markings on to the screen to obtain two stripe images which must both be brought into register. With transverse lenticulation the difficulty is overcome by making the slit through which exposure is effected so narrow that any difference of shrinkage over the length of film corresponding to the slit width becomes negligible.

Another difficulty occurring in the copying of lenticular film is the watering or moiré effect which is due to the combination of two sets of lenticulations which do not quite register. Even a very small difference is sufficient to produce a pattern like that of watered silk.

According to a further feature of the invention this difficulty is overcome by removing the lenticulations on the part of the original film occupied by the actual picture, of course after the exposure has been made. The removal of the lenticulation may be permanent. In this case the lenticulation is removed before copying by grinding, milling, planing or by any other suitable mechanical treatment or even by suitable chemical treatment of the film surface.

It is also possible to remove, or at least obliterate, the lenticulation by filling up the interstices level with some transparent material having the same index of refraction as the film support. If a volatile substance is used as filler the obliteration of the lenticulation is only temporary.

A suitable arrangement for carrying out the method of the invention may comprise one or two auxiliary objectives for projecting one or both film margins on an enlarged scale on to a screen, together with regulating devices for adjusting at least one film gate and as the case may be the copying objective so that the markings projected are brought into register.

For the purpose of fine adjustment the film gate for the original film and the objective are in the preferred construction movable by means of a handwheel through a positive reduction drive. The objective can also be moved sideways by similar means.

Any difference between the directions of lenticulation in the two films would give rise to a relative lead or lag between the images of the elements and this defect can be overcome by the use of pivoted optical flats placed in the light path.

The pivoting movement of these flats can be controlled by cams so cut that one complete revolution provides compensation equal to the width of one lenticular element. One pair of optical flats is connected to a handwheel through its associated cams in such a way that on turning the handwheel one way one flat is moved and on moving it the other way the other one is moved.

Arrangements are also made for the objective not only to be adjusted longitudinally and transversely to the optical axis but also for its sliding support to be urged by a spring with the interposition of a roller against a pivoting lever adjustably mounted on the adjustable sliding support.

The arrangement according to the invention can also be made to operate automatically by projecting the markings of the films on to photoelectric cells connected through relays to the adjusting means for the film gate and the objective. When the markings are in register the adjustment is not operated, but on the occurrence of any deviation the approprate adjustment is effected automatically. When different colours are used for the markings on the two films, such as yellow for the original and blue for the copy one photo-electric cell may be made to respond preferentially to one colour and one to the other, while the mixture colour does not cause the cells to respond.

The arrangement for making contact copies of films with transverse lenticulation may comprise in the film guide for the continuously moving films a window at each end of the copying slit, through which the register markings are projected on an enlarged scale on to a screen. The films can be moved longitudinally in relation to each other and can also be relatively pivoted during their travel in the neighbourhood of the copying slit. The copy film has a spring-urged bar pressed against one edge and its other edge abuts against a fixed bar, both these bars projecting above the gate surface by only the thickness of the film. The original film is guided by similar bars, one spring-urged and the other pivoted to adjust the film direction.

It is advantageous to insert in the light path in front of the actual image of the copy film an interchangeable optical device which acts only on the image space. The object of the optical device is to compensate for the displacement of the individual colour records in relation to the corresponding elements of the lenticulation due to the difference in optical data as between the taking and reproducing apparatus. Such optical devices may be for instance interchangeable optical flats of different thicknesses and of such dimensions that they act only on the picture field but not on the registration marks. It is also possible to use for the same purpose convex or concave cylindrical or spherical lenses of various focal lengths, but still limited in action to the picture area. A further alternative is a stepped glass plate having the same thickness opposite the registration marks but different thickness opposite the picture area.

A further consideration has to be borne in mind in order to produce satisfactory copies. The lenticular film available commercially exhibits a constantly varying angle between the direction of lenticulation and the film edges. The consequence is that in the projection of such films, especially with a high degree of enlargement, the lenticulation marks constantly swing to and fro. This drawback is overcome by a further feature of the invention. The film is first cut by the usual means to a width a few millimeters over the standard. The film strips are then passed through a device which cuts the film to the correct width and at the same time impresses it with the lenticulation. An arrangement suitable for this purpose comprises an impression roll and a counter-pressure roll together with cutting discs flanking the rolls. Instead of flat cutting discs it is possible to use dished discs mounted on oblique spindles so that the film only passes the cutting edges once.

Further details of the invention are given in the subsequent description of some forms of construction to be used in connection with the invention and shown in the accompanying drawings in which Figure 1 is an enlarged cross section of a lenticular film, Figure 2 is a similar view showing the apices of the lenticular elements, ground off, Figure 3 illustrates a part of the projected image of the registration marks before they are quite in register, Figure 4 is a diagrammatic representation of an arrangement according to the invention for copying by optical means films with longitudinal lenticulation, Figure 5 is a piece of film with longitudinal lenticulation to illustrate the wandering of the lenticulation, Figure 6 is an end view of Figure 4 to show the projection screen and operating handles, Figure 7 is a piece of original film with transverse lenticulation and Figure 8 a corresponding piece of copy film, Figure 9 is a diagrammatic representation of an arrangement according to the invention for copying by contact films with transverse lenticulation, Figure 10 is an end view of Figure 9 showing the projection screen and operating handles, Figure 11 shows the illumination slit for Figure 9 on a larger scale, Figure 12 is a diagram to show automatic control, and Figure 13 is a plan and Figure 14 an elevation of a cutting and impressing device.

As shown in Figure 1 the lenticulation consists of a number of closely adjacent semicylindrical lenses 1 produced by impressing the side of the film support 3 opposite the emulsion 2. If the apices of the lenses are ground off, say down to the dotted line 4 of the figure, it will be seen that the depressions remaining form a row of parallel stripes which can be used as a marking for adjusting the original and copy films into register. The stripes can be made more distinct by blackening or colouring as shown in Figure 2, so that a row of parallel stripes 6 with intervening spaces 7 is formed. The marking can also be made more distinct by first colouring the film and then grinding it. The colouring matter then fills up the interstices 5 between the flattened lenticulation 7 as may be seen in Figure 2.

It has already been mentioned that transparent and distinctive colouring can be used for the original and the copy film, such as yellow and blue. In projection the yellow and blue stripes are projected on top of each other, so that when they register correctly the stripes appear plain green in the projection. Figure 3 shows the appearance of the projection before perfect registration is obtained. The yellow stripes indicated by left hand hatching 8 only partly cover the blue ones indicated by right hand hatching 9, so that what is seen is a row of green stripes 10 shown by cross hatching which each have a yellow fringe 8 on one side and a blue fringe 9 on the other. Adjustment must therefore be carried out so as to make the yellow and blue fringes vanish, that is so that the image is one of pure green stripes.

Such an adjustment can be effected by means of apparatus as indicated in Figure 4. The original film 11 is here to be reproduced on the copy film 12. The two films are guided in gates 18 and 19 respectively in a direction perpendicular to the plane of the drawings. Copying is carried out by means of an objective 14, which projects an image of the original film 11 on to the copy film 12. In the explanations which now follow it will be assumed that both films are provided with coloured stripes for registration in the marginal parts, and that those on the original film are yellow and those on the copy film blue.

These marginal parts are imagined by means of two auxiliary objectives 15 and 15' on an enlarged scale on a screen 16. The enlarged images are designated 17 and 17' and can be seen better in Figure 6, which will be referred to later. In copying the various parts must be so adjusted that the stripes register in both images 17 and 17'. For this purpose it is necessary for the images of the marginal parts of the films lying against the fixed side of the gates—in the drawings the lower edge of original film 11 and the upper edge of copy film 12—to register. This may be accomplished by a lateral adjustment either of one of the gates, preferably the gate 18 for the original film, or of the objective 14. In the construction shown the objective 14 can be shifted as will subsequently be explained.

The next condition to be fulfilled is to have the lenticulation lines strictly parallel. In films with longitudinal lenticulation the lines are as a rule not accuratey parallel to the film edge: they usually form a small angle with it and this angle may be different in the two films 11 and 12. Figure 5 serves to illustrate this divergence. Here the full lines are the lenticulation lines of one film, say the original film 11, and the dotted lines those of the other or copy film 12. The full lines run at a certain small angle to the film edge and the dotted lines are shown at a rather larger angle thereto.

To get the lenticulation lines parallel in projection one of the gates must be capable of rotation in its own plane. In the arrangement of Figure 4 the gate 18 can be rotated by means of a handwheel 20. This handwheel is placed on an operating panel (not shown) and a suitable mechanical connection between it and the gate 18 provides for a fine adjustment of the angular position of the latter.

When the image 17 of one film margin is brought into register by suitable adjustment of the objective 14 and the gate 18, the image 17' of the other film margin is also in register provided the lenticulation is quite uniform over the whole width of the film. If this should not be the case, say due to unequal shrinkage of the two films, other measures must be taken to ensure registration of the image 17' as well. Registration is secured by altering the ratio of reproduction, i. e. by moving the objective 14 along its optical axis. The required movement is effected by means of a handwheel 21 on the operating panel which is connected by suitable mechanical transmission to a sliding carriage 23 carrying the objective 14.

Two conditions have to be observed in the adjustment of the objective along its optical axis. To keep the image sharp on the copy film 12 the original film 11 must be moved a distance corresponding to the movement of the objective. A positive connection between the carriage 23 and the gate 18 may be used as already known for such a dependent movement. Nevertheless in view of the small extent of the maximum shrinkage of the original film there is generally no need to move the gate 18, for the necessary movement of the objective 14 is quite small, say of the order of 1 mm. Furthermore the required movement of the original film may be only about 1/100 of that of the objective, so that the movement of the film of the order of 0.01 mm. which is theoretically necessary is within the depth of focus of the objective.

The other circumstance which must be borne in mind is that the image of the lower edges of the film 11 is shifted when the objective is moved along its optical axis. This can be corrected by a corresponding transverse movement of the objective. The necessary transverse movement can be carried out automatically by the following arrangement. The objective is mounted on a carriage 22, which slides transversely on the longitudinally sliding carriage 23. The carriage 22 rests against an abutment member 26 by means of a roller 25. The member 26 is pivoted on a block 29 and can be adjusted by means of a micrometer screw 27 to such an inclination in relation to the block 29 that the appropriate transverse movement is imparted to the objective 14 as the roller 25 runs over the abutment member 26 during the longitudinal movement of the objective. The transverse carriage 22 with its roller 25 is pressed against the abutment member 26 by means of a suitable spring 24. The block 29 can be adjusted in a guide 29' by means of a micrometer screw 28. The last named screw is rotated to adjust the objective initially in the transverse direction.

Since as mentioned above the lenticulation is not exactly parallel to the film edge, while the films are passing through the gates the lines of lenticulation will be observed to wander across the film as indicated by an arrow in Figure 5. Now this wandering depends in speed on the angle between the lenticular elements and the film edge, and it therefore becomes necessary to undertake some adjustment to compensate for the difference in speeds of wandering.

The arrangement provided for this purpose comprises an optical flat 33 inserted in the path of the light between the original film 11 and the copy film 12. The flat is pivoted and rests by means of an arm 32 against a spiral cam 31. The cam can be rotated by means of a handwheel 30 on the operating panel through a suitable drive. Deflection of the plate 33 shifts the image of the film 11 in relation to the film 12 in a certain direction. The thickness of the plate 33 and the pitch of the cam spiral are made such that the movement of the image by one revolution of the cam 31 is equal to the width of one lenticular element. For shifting in the opposite direction a similar system is provided comprising an optical flat 33' with an arm 32' resting against a spiral cam 31' which can be rotated by a handwheel 30'.

Two separate glass plates are shown, but only for the sake of clarity. In actual practice it is preferable to use only one optical flat and to provide means for swivelling it in either direction. The separate adjusting devices shown are then combined into one, and the combined device is operated by a single handwheel, which is turned in one direction or the other to swivel the glass plate in the required direction.

For the sake of completeness the projection screen 16 is shown in Figure 6 as seen by the operator with the handwheels 20, 21, 30 and 30' in front of or behind it and with the images of the film markings 17 and 17' projected upon it. In the example of Figure 6 it is assumed that the projection screen 16 is translucent, so that the operator can conveniently observe the markings 17 and 17' while actuating the various handwheels.

Figures 7 and 8 show films with transverse lenticulation in which the marginal parts have been treated in accordance with Figure 2. It will be assumed that the films of Figures 7 and 8 have their depressions filled with opaque material. Let Figure 7 be the original film 11 and Figure 8 the copy film 12. The two films are brought into register by bringing the black transverse lines 17 of film 11 into line with the corresponding black transverse lines 17' of film 12. For this purpose the markings are provided on alternate halves of the film margins, as may be seen by comparing the two figures. In film 11 only the outer half a of the film margin is provided with transverse markings and in film 12 only the inner half b. The other part of the lenticulation on the margin is planed off or otherwise removed. The widths a and b together make up the marginal area c of the films 11 and 12.

Figures 9 and 10 show an arrangement for contact copying of the transversely lenticulated film shown in Figures 7 and 8. Such film can also be copied by optical means. The films 11 and 12 in the arrangement shown are fed in contact with each other through gates 18 and 19 past an illumination slit 13 shown on a larger scale in Figure 11. The slit width is so small that any difference in shrinkage between films 11 and 12 is of no significance. At the marginal portions of the films the slit width is rather larger, so that the two areas 13 and 13' (Figure 11) are formed, which are projected by means of auxiliary objectives 15 on to the screen 16. Just as described in connection with the arrangement of Figures 4 and 6, enlarged images 17 and 17' of the stripes on the film margins appear on the screen 16 as shown in Figure 10.

To bring the stripes of these images into alignment various adjustments have to be effected in this case also. To secure parallelism of the stripes one gate, e. g. 19, is rotatable in its own plane in relation to the other. Rotation is carried out by means of a handwheel 40 through suitable transmission gear such as a worm 37 and worm wheel 36.

One film can be shifted in relation to the other by means of rollers 43 and 43', which press on the films 11 and 12 between the gates 18 and 19 and the driving sprockets 41 and 42 respectively. The rollers 43 and 43' are mounted on one end each of bell crank levers 44 and 44' urged by springs 46 and 46' against cams 45 and 45'. The cams can be rotated through suitable transmission mechanism by means of handwheels 47 and 47' located on an operating panel (not shown).

Since in contact copying the films are preferably fed through the apparatus at uniform speed, an arrangement is provided for projecting stationary images 17 and 17' on the screen 16. In the example shown this arrangement comprises two mirrors 50 and 51 located in the path of the light between the auxiliary objectives 15 and the screen 16. One mirror 51 is mounted on an arm 52 to oscillate. The arm 52 is urged by a spring 53 against the periphery of a cam 54 driven synchronously with the film feeding mechanism. The shape of the cam 54 is such that the deflection of the beam of light by the mirror 51 exactly compensates for the movement of the films through the areas 13'.

The adjustments described can be effected automatically instead of by hand. For this purpose use is made of light sensitive members such as photo-cells or selenium cells of differing spectral sensitivity. They are so mounted that they are influenced by the projected images of the marginal lines, and carry out the necessary adjustments in the known way directly or indirectly by means of relay devices when the images change from the normal condition. Any change from the normal condition is indicated either by the appearance of coloured fringes on the combined colour, where edges of different colours are used, or by lack of alignment of the stripes when opaque markings are employed.

Differing spectral sensitivity can be produced by the particular method of manufacture of the light sensitive members in question (e. g. in photo-cells the use of potassium or caesium) or by the insertion of colour filters in front of the members (e. g. in the case of selenium cells). Figure 12 is a diagram to show the application of such an automatic device. The markings 17 and 17' are imaged by an optical device 56 on the photo-cell 55 and according to their relative position give rise to discriminatory currents or voltages in the cell device 55, so that relays in the circuit 57, 57' can take over the functions of the handwheels. In the diagrammatic representation of Figure 12 it is assumed that the images of the registration lines are produced by an arrangement like that of Figure 9.

In Figures 13 and 14 an arrangement is shown in diagrammatic form which carries out the edge trimming and lenticulation of the film in one operation. An impression roll 58 and a counter-pressure roll 59 are spaced apart by the thickness of the film. The untreated film is passed between the rolls in the direction of the arrow. Both rolls are of the same width as the standard finished film and dished cutting discs 61 and 62 running at high speed are mounted in close contact with their two sides to cut the film 60 as it is passing through and being impressed with the lenticulation. Accordingly the spacing of the cutters 61 and 62 is exactly the standard width of the finished film. The shafts 62 and 63 carrying the cutters are oblique to the shaft 65 of the impression roll 58, so that the film 60 is only in contact with the cutters at the moment of impression.

I claim:

1. In an arrangement for making lenticular film copies from lenticular film originals, markings on both original and copy films on the margin beside the picture area at least at one side thereof corresponding to and located at the same spacing as the lenticular elements, film gates for guiding both said films, means for bringing the lenticulations of the two films into register which means comprise a screen and at least one objective for projecting on to said screen enlarged superposed images of at least one margin of the original and copy films.

2. An arrangement as claimed in claim 1 comprising adjusting means for rotating one film gate in its own plane relatively to the other.

3. An arrangement as claimed in claim 1 for optically copying films with longitudinal lenticulation comprising a copying objective between the original and copy film, supporting members for said copying objective and film gates, means for adjusting at least one of said supporting members, whereby the film margin may always be projected on to the same position on the screen.

4. In an arrangement as claimed in claim 1 a copying objective between the original and copy films, supporting members for said copying objective and film gates, adjusting means for compensating difference in shrinkage between the original and copy films, said adjusting means being adapted to move at least one of said supporting members along the optical axis to vary the ratio of reproduction between original and copy film.

5. In an arrangement for optically copying films with longitudinal lenticulation, markings on both original and copy films on the margin beside the picture area at least at one side thereof corresponding to and located at the same spacing as the lenticular elements, means for bringing the lenticulations of the two films into register, said means comprising a screen, at least one objective for projecting on to said screen enlarged superposed images of at least one margin of the original and copy film, film gates for guiding said films, supporting members for said film gates and said copying objective, means for transversely adjusting at least one of said supporting members, whereby the film margin may always be projected on to the same position on said screen, adjusting means for compensating difference in shrinkage between the original and copy films adapted to move at least one of the said supporting members along the optical axis to vary the reproduction ratio, and means for rendering interdependent the adjusting means for the longitudinal and transverse movements of the copying objective relative to both films to keep the projection of one margin of the original film always at the same place on said screen irrespective of the longitudinal adjustment.

6. An arrangement as claimed in claim 5 in which the transverse adjustment of the objective is carried out by means of an abutment surface variable as to position and shape in relation to the optical axis by micrometer screws and in which the objective support is yieldably urged against the abutment surface throughout its longitudinal movement.

7. An arrangement as claimed in claim 1 comprising at least one swivelling optical flat in the light path between the original and copy films to compensate for the wandering of the lenticulation lines.

8. An arrangement as claimed in claim 1 for copying by contact films with transverse lenticulation comprising means for adjusting the relative longitudinal positions of the original and copy films.

9. An arrangement as claimed in claim 1 for copying by contact films with transverse lenticulation comprising a transverse slit past which the films are fed at constant speed and through which the exposure takes place, the slit being narrow enough to obviate any deleterious effect due to different shrinkage between original and copy films.

10. An arrangement as claimed in claim 1 for copying by contact films with transverse lenticulation comprising a transverse light slit past which the films are fed at constant speed and through which the exposure takes place, the slit being narrow enough to obviate any deleterious effect due to different shrinkage between original and copy films, said slit having widened end portions opposite said markings.

11. An arrangement as claimed in claim 1 for copying by contact films with transverse lenticulation and continuous movement of both films through a physical light slit comprising means adapted for keeping the projected image of the registration marks stationary.

12. An arrangement as claimed in claim 1 for copying by contact films with transverse lenticulation and continuous movement of both films through a physical light slit comprising an oscilating mirror operating synchronously with the film movement adapted for keeping the projected image of the registration marks stationary.

MORITZ ADAM.